United States Patent [19]

Ellis

[11] 3,870,296

[45] Mar. 11, 1975

[54] NOVELTY AND AMUSEMENT DEVICE SIMULATING AN ANIMAL LEASH

[75] Inventor: Joel F. Ellis, Lincolnwood, Ill.

[73] Assignee: H. Fishlove & Company, Chicago, Ill.

[22] Filed: Nov. 10, 1972

[21] Appl. No.: 305,576

[52] U.S. Cl. .................................. 272/8 N, 119/109
[51] Int. Cl. ............................................... A63j 5/00
[58] Field of Search .............. 272/8 R, 8 N; 46/123; 119/109, 96; D30/38

[56] References Cited
UNITED STATES PATENTS

| | | | |
|---|---|---|---|
| 2,833,249 | 5/1958 | Cornman | 119/109 |
| 2,911,947 | 11/1959 | Kramer | 119/109 |
| 3,099,250 | 7/1963 | Soles, Jr. | 119/109 X |
| 3,200,537 | 8/1965 | Glass et al. | 46/123 X |
| 3,298,131 | 1/1967 | Monahan | 46/123 X |
| 3,760,532 | 9/1973 | Campion | 46/104 |
| D135,752 | 6/1943 | Curtis | DIG. 30/38 |

OTHER PUBLICATIONS

"Case of Missing Dog," Washington Evening Star, Mar. 30, 1972, p. A-3.

"'Rope Trick' Pictured in Clever Camera Hoax," Popular Science Monthly, Mar, 1935, p. 37.

Primary Examiner—Richard C. Pinkham
Assistant Examiner—R. T. Stouffer
Attorney, Agent, or Firm—Max R. Kraus

[57] ABSTRACT

A novelty and amusement device simulating an animal leash, for example, a dog leash comprising a rod held at the rear end thereof with the front end supporting a simulated harness, which gives the impression or appearance that an animal such as a dog or the like has been or is being harnessed thereto, the impression given to observers being that the animal has escaped from the leash without the holder being aware of same. The rod is preshaped to give the appearance that the animal is harnessed to the front of the rod and while the rod is sufficiently rigid to maintain its preformed shape it is sufficiently flexible and resilient so that when held in the hand by the person it will swing or sway, simulating the effect of a dog or other animal leashed to the front thereof.

1 Claim, 5 Drawing Figures

PATENTED MAR 11 1975 3,870,296
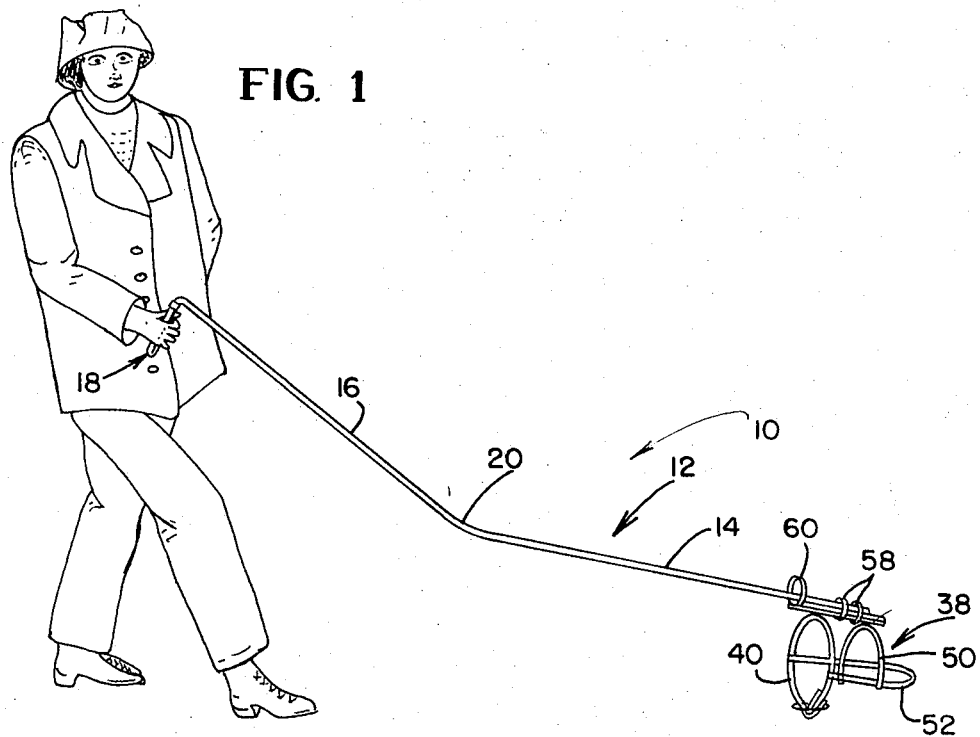
FIG. 1
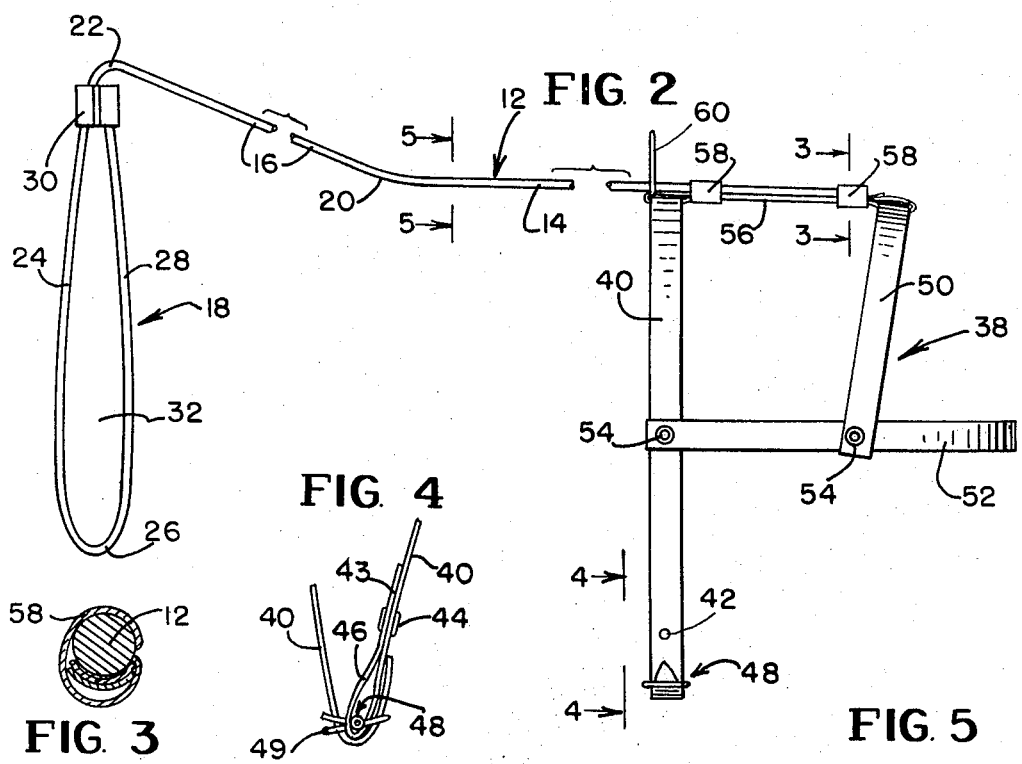
FIG. 2
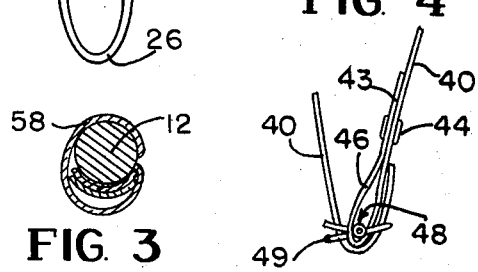
FIG. 3    FIG. 4
FIG. 5

NOVELTY AND AMUSEMENT DEVICE SIMULATING AN ANIMAL LEASH

BRIEF SUMMARY OF THE INVENTION

Leashes for dogs or other animals are well-known and normally the animal runs or walks forwardly of the person and is restrained by the leash. One of the objects of this invention is to provide a novelty and amusement device which will simulate a leashed dog or other animal, but without the animal being attached to said leash, that is, the front of the leash has no dog or other animal attached to it. As the person walks along holding the leash forwardly, the leash will swing, sway or move as though a dog or other animal were attached to it. The sight of a person walking and holding a leash extended forwardly of his person without an animal attached to the leash and restrained thereby provides a novel and amusing device and will attract the attention of onlookers who will either think that the animal has escaped from the leash without the knowledge of the person holding the leash or will be amused by what appears to be a foolish or ludicrous act.

BRIEF DESCRIPTION OF THE DRAWINGS

In the drawings:

FIG. 1 is a perspective view of the leash forming this invention and showing same supported by a person's hand in the manner in which it would be held.

FIG. 2 is an enlarged side elevational view with portions of the rod broken away.

FIG. 3 is a sectional view taken on line 3—3 of FIG. 2.

FIG. 4 is an elevational view taken on line 4—4 of FIG. 2; and

FIG. 5 is a sectional view taken on line 5—5 of FIG. 2.

The leash, generally indicated at 10, is formed of a steel rod 12 which is preferably circular in cross section and which is sufficiently rigid to support at the front thereof the weight of the harness.

The rod 12 is bent or preshaped along its length to provide a front portion 14, a rear portion 16 and a handle portion 18, the bend being indicated at 20 and being substantially midway between the length of the front and rear portions 14 and 16. The handle portion 18 which is formed as a continuation of the rod is bent at 22 to form a downwardly extending handle portion 24 which is reversely bent at the bottom as at 26 to form an upwardly extending handle portion 28 spaced from the portion 24. The upper end of portion 28 is secured to the portion 24 by a metal ring or clip 30 which holds them together to form the handle portion 18. The spacing or opening 32 between the handle portions 24 and 28 can accommodate the fingers of the hand passing therethrough and being curled around so that the rod can be thus held if so desired, or the fingers may be wrapped around both portions of the handle as shown in FIG. 1 if so desired. The handle portion 18 is generally perpendicular to the rear portion 16.

The entire rod, including the handle, is covered by a vinyl covering 34 which may be stitched along its length as at 36 so that the rod is completely enclosed by said vinyl covering which hides the metal rod and provides a decorative appearance.

The front end of the rod 12 supports a harness member, generally designated at 38, which is of conventional appearance to give the appearance that it is or has been secured to a dog or other animal. The harness member has a rear looped strap 40 having a number of spaced openings 42 at one end. The opposite end of the strap is folded on itself as at 43 and is fastened thereto as at 44 to form a looped end 46 for supporting and retaining a conventional metal buckle 48 with the tongue 49 of the buckle adapted to be passed through one of the spaced openings 42 in the opposite end of the strap so that the free end of the strap can be buckled.

The harness has a front looped strap 50 and a connecting strap 52 which extends horizontally between the two straps and forwardly thereof and said horizontal strap is secured to the straps 40 and 50 by rivets or suitable fastening eyelets 54. The three straps 40, 50 and 52 form a cage-like appearance which is intended to simulate the conventional harness means through which the head of a dog or other animal is passed so that the harness fits around the neck portion of the animal. The two straps 40 and 50 are connected together by a top connecting strap 56 connected to straps 40 and 50 by eyelets or other fastening means. The entire harness is attached and affixed to the front end of the rod by means of a pair of metal clips or bands 58 which wrap around the front end of the rod. There is also a metal ring 60 extending through the looped portion of the top connecting strap 56, which ring extends around the rod 12.

When the leash is held in the hand, as shown in FIG. 1, the rear portion 16 of the rod 12 will be suspended at an inclined angle with the front portion 14 of the rod sloping downwardly and forwardly towards the ground level, in much the same manner as if the harness 38 were attached to the neck of a dog or other animal. The harness will be spaced from the ground. As the person walks along holding the rod forwardly, the front portion 14 of the rod is inclined at a different angle from the rear portion 16 and the rod, particularly along its length, will have a tendency to swing or move up and down as well as laterally since the rod while generally rigid has sufficient flexibility and resiliency even while maintaining its preformed shape to permit such movement.

It can be readily appreciated that it would be an amusing sight to see a person walking along the street holding a leash which tends to swing up and down and sideways without a dog or other animal being leashed thereto. To onlookers it gives the appearance that the dog or other animal has become unleashed and has run away with the person holding the leash being unaware of same. An onlooker would tend to point this out to the holder which would be amusing, or the observer would assume that the holder is foolish.

I claim:

1. A novelty and amusement device so constructed and arranged to be held by a person and simulating an animal leash and conveying the impression to observers that an animal such as a dog or the like formerly secured to the leash has escaped therefrom with the person holding the leash being unaware of said escape, said device comprising a longitudinal non-extendible rod member of substantial length with a handle portion adjacent the rear thereof, an animal harness secured to the front end thereof, and a substantial distance forwardly of the handle portion, said harness being of conventional appearance and being so shaped and constructed as to be the type of harness that an animal could be harnessed in when leashed, said device simulating an animal leash to be held by a person so that the harness is held spaced from the ground surface, said harness at all times being free of securement to any animal, simulated animal, or portion of any simulated animal, said rod member being preformed into a shape which gives the appearance that a dog or other animal was still leashed to the harness, and said rod member being generally rigid to maintain said shape but sufficiently flexible and resilient so that when held by a person the rod member will tend to move up and down simulating the movement as though a dog or other animal was still leashed to the harness.

* * * * *